United States Patent
Mehra et al.

(10) Patent No.: US 10,419,843 B1
(45) Date of Patent: Sep. 17, 2019

(54) BONE CONDUCTION TRANSDUCER ARRAY FOR PROVIDING AUDIO

(71) Applicant: Facebook Technologies, LLC, Menlo Park, CA (US)

(72) Inventors: Ravish Mehra, Redmond, WA (US); Antonio John Miller, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/925,103

(22) Filed: Mar. 19, 2018

Related U.S. Application Data

(60) Provisional application No. 62/486,774, filed on Apr. 18, 2017.

(51) Int. Cl.
- *H04R 25/00* (2006.01)
- *H04R 1/10* (2006.01)
- *G02B 27/01* (2006.01)

(52) U.S. Cl.
CPC ......... *H04R 1/1091* (2013.01); *G02B 27/017* (2013.01); *H04R 1/105* (2013.01); *H04R 1/1008* (2013.01); *G02B 2027/0178* (2013.01); *H04R 2400/03* (2013.01); *H04R 2499/15* (2013.01)

(58) Field of Classification Search
CPC ........ H04R 1/008; H04R 1/1016; H04R 3/14; H04R 25/606; H04R 2225/67; H04R 2460/13; H04R 2499/11; G02B 27/017; G02B 27/0172; G02B 27/0176; G02B 2027/0178; G02C 11/06; G02C 11/10

USPC ..... 381/58, 59, 96, 151, 326, 327, 380, 381; 73/585; 600/25

See application file for complete search history.

(56) References Cited

U.S. PATENT DOCUMENTS

| | | | | |
|---|---|---|---|---|
| 5,800,336 A | * | 9/1998 | Ball ..................... | H04R 25/606 600/25 |
| 6,261,224 B1 | * | 7/2001 | Adams ..................... | H04R 1/46 600/25 |
| 7,822,215 B2 | * | 10/2010 | Carazo ................... | H04R 17/00 381/151 |
| 8,532,321 B2 | * | 9/2013 | Parker .................... | H04R 25/70 381/326 |
| 9,766,481 B1 | * | 9/2017 | Asfaw .................... | G02C 11/06 |
| 9,906,878 B2 | * | 2/2018 | Abolfathi ................ | A61C 5/00 |
| 10,231,053 B1 | * | 3/2019 | Mehra ...................... | H04R 3/14 |

(Continued)

OTHER PUBLICATIONS

Abhayapala, T.D. et al., "Nearfield Broadband Array Design Using a Radially Invariant Modal Expansion," J. Acoust. Soc. Am., Jan. 2000, pp. 392-403, vol. 107, No. 1.

(Continued)

*Primary Examiner* — Binh Kien Tieu
(74) *Attorney, Agent, or Firm* — Fenwick & West LLP

(57) ABSTRACT

Embodiments relate to providing audio by focusing vibrations from an array of a plurality of bone conduction transducers to a cochlea of a user's ear. When bone conduction signals are received, bone conduction transducers of the array transmit vibrations to the cochlea of the user. A bone conduction signal generator generates the bone conduction signals, which may vary in amplitude and phase for different bone conduction transducers to amplify a level of vibrations at the cochlea of one ear while attenuating vibrations at another cochlea of another ear.

20 Claims, 6 Drawing Sheets

(56) References Cited

U.S. PATENT DOCUMENTS

| | | | | |
|---|---|---|---|---|
| 2007/0041595 A1* | 2/2007 | Carazo | ................. | H04R 17/00 |
| | | | | 381/151 |
| 2009/0245556 A1* | 10/2009 | Parker | .................... | H04R 25/70 |
| | | | | 381/326 |
| 2009/0253951 A1* | 10/2009 | Ball | ....................... | H04R 11/02 |
| | | | | 600/25 |
| 2015/0216762 A1* | 8/2015 | Oohashi | ................ | A61M 21/02 |
| | | | | 601/47 |

OTHER PUBLICATIONS

Bianchi, L. et al., "Robust Beamforming Under Uncertainties in the Loudspeakers Directivity Pattern," 2014 IEEE International Conference on Acoustics, Speech and Signal Processing (ICASSP), pp. 4448-4452.

Mailloux, R.J., *Phased Array Antenna Handbook*, Third Edition, 2018, Artech House, pp. 113-196 (92 pages total).

Van Trees, H., *Optimum Array Processing, Part IV of Detection, Estimation and Modulation Theory*, New York: Wiley-Interscience, 2002, pp. 575-585, 864-874, 1062-1088 (63 pages total).

\* cited by examiner

BONE CONDUCTION TRANSDUCER ARRAY FOR PROVIDING AUDIO

CROSS REFERENCE TO RELATED APPLICATION

This application claims priority under 35 U.S.C. § 119(e) to U.S. Provisional Patent Application Ser. No. 62/486,774, filed on Apr. 18, 2017, which is incorporated by reference herein in its entirety.

BACKGROUND

This disclosure relates generally to an audio system and specifically relates to providing audio using a bone conduction transducer array.

Head mounted displays (HMDs) may be used to present virtual and/or augmented information to a user. For example, an augmented reality (AR) headset or a virtual reality (VR) headset can be used to simulate an augmented/virtual reality. Conventionally, a user of the AR/VR headset wears headphones to receive, or otherwise experience, the computer-generated sounds. However, wearing headphones suppresses sound from the real-world environment, which may expose the user to unexpected danger and also unintentionally isolate the user from the environment. Moreover, headphones separated from the outer casing or a strap of the HMD may be aesthetically unpleasing and may also be damaged through use.

Hence, in place of headphones, bone conduction transducers may be used in HMDs. The bone conduction transducers are positioned around the ears to generate vibrations that send sound to the internal ear through the cranial bones. The bone conduction transducers can be made compact and be mounted on a strap or leg of the AR/VR headset for convenient use. However, using a pair of bone conductive transducers for both ears may result in crosstalk due to sharing of the user's cranial bone as a common medium for transmitting the vibrations. Additionally, calibration methods are challenging because hearing sensations are generated inside the cochlea of a user.

SUMMARY

Embodiments relate to a head-mounted display (HMD) including a bone conduction signal generator, a first bone conduction transducer, and a second bone conduction transducer. The bone conduction signal generator generates first and second bone conduction signals. The first bone conduction transducer contacts a patch of skin in a first ear region of the user, and transmits first vibrations responsive to receiving the first bone conduction signal. The first vibrations cause a level of vibrations at a target region in the first ear region. The second bone conduction transducer contacts the patch of skin in the first ear region, and transmits second vibrations responsive to receiving the second bone conduction signal. The second vibrations increase the level of vibrations at the target region.

In one or more embodiments, the first and second bone conduction transducers may be part of a set of bone conduction transducers. The set of bone conduction transducers may be arranged as a single line, in a circular pattern, or in other types of configurations. The bone conduction signal generator can modify the amplitude or phase of the first and second bone conduction signals.

BRIEF DESCRIPTION OF THE DRAWINGS

Figure (FIG.) 1A is a perspective view of a head mounted display including bone conduction transducer assemblies, according to one embodiment.

Figure 1A:
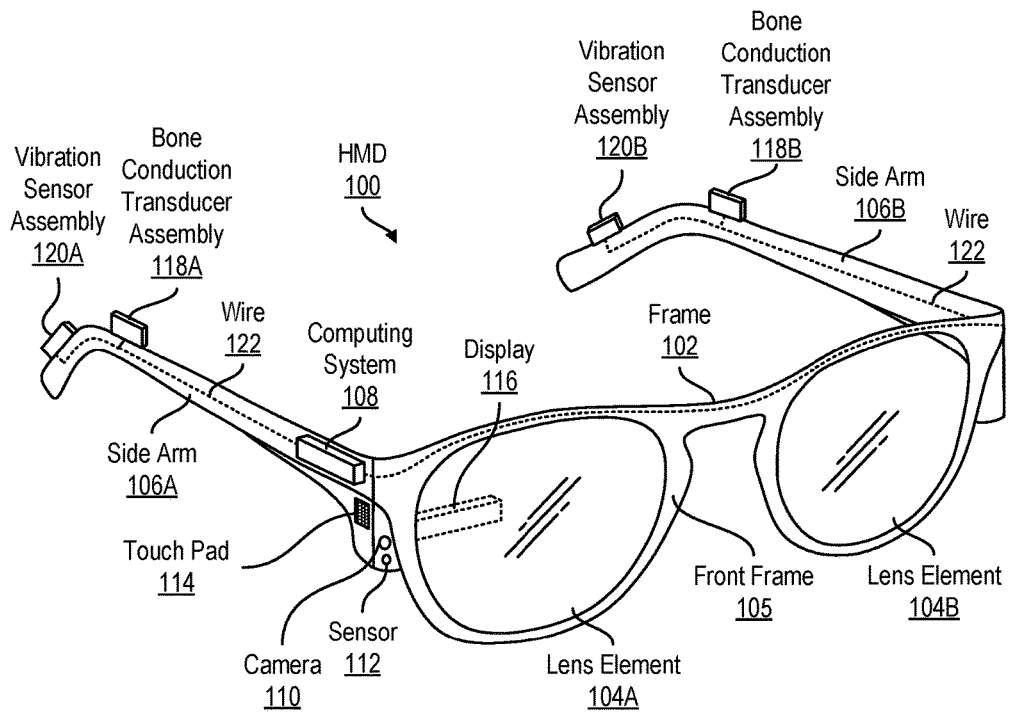
FIG. 1B is a side view of the head mounted display of FIG. 1A, according to one embodiment.
FIG. 1C is a side view of the head mounted display of FIG. 1A including a bone conduction transducer array arranged in a single line, according to one embodiment.
FIG. 1D is a diagram of a bone conduction transducer array arranged in a circular pattern, according to one embodiment.
FIG. 1E is a diagram of a bone conduction transducer array including bone conduction transducers that are not circular-shaped, according to one embodiment.

The figures depict embodiments of the present disclosure for purposes of illustration only.

DETAILED DESCRIPTION

Embodiments are described herein with reference to the accompanying drawings. Principles disclosed herein may, however, be embodied in many different forms and should not be construed as being limited to the embodiments set forth herein. In the description, details of well-known features and techniques may be omitted to avoid unnecessarily obscuring the features of the embodiments. In the drawings, like reference numerals in the drawings denote like elements. The shape, size and regions, and the like, of the drawing may be exaggerated for clarity.

Embodiments relate to providing audio by focusing vibrations from an array of a plurality of bone conduction transducers to a cochlea of a user's ear. When bone conduction signals are received, bone conduction transducers of the array transmit vibrations to the cochlea of the user. A bone conduction signal generator generates the bone conduction signals, which may vary in amplitude and phase for different bone conduction transducers to amplify a level of vibrations at the cochlea of one ear while attenuating vibrations at another cochlea of another ear.

Overview of Example System

Figure 1B:
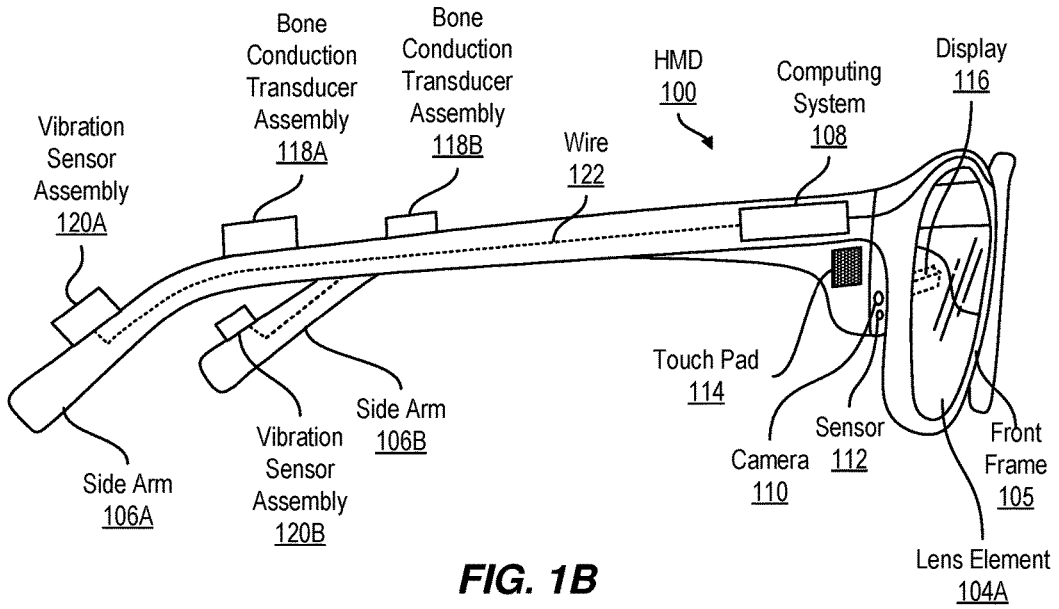

Figure (FIG. 1A illustrates a perspective view of a head mounted display (HMD) 100 including bone conduction transducer assemblies, according to one embodiment. The HMD 100 includes a frame 102, a computing system 108, a camera 110, a sensor 112, a touch pad 114, a display 116, right and left bone conduction transducer assemblies 118A and 118B (hereinafter collectively referred to as "bone conduction transducer assemblies 118"), and right and left vibration sensor assemblies 120A and 120B (hereinafter collectively referred to as "vibration sensor assemblies 120"). FIG. 1B illustrates a side view of the HMD 100, according to one embodiment.

The frame 102 enables the HMD 100 to be secured to a user's head, for example, to a nose and ears of the user. In some configurations, the frame 102 is a solid structure and in other configurations, the frame 102 is a hollow structure (or a combination of solid and hollow structures). The frame 102 includes a front frame 105 securing right and left lens elements 104A and 104B (hereinafter collectively referred to as "lens elements 104") and right and left side arms 106A and 106B (hereinafter collectively referred to as "side arms 106"). The side arms 106 are connected to the front frame 105. When the HMD 100 is worn by the user, the side arms 106 are positioned behind the ears of the user of the HMD 100 and secure the HMD 100 to the user.

The lens elements 104 are made of materials that are at least partially transparent. Such lens elements 104 facilitate the user of the HMD 100 to engage in an augmented reality (AR) environment where a projected image is superimposed over a real-world view as perceived by the user of the HMD 100 through the lens elements 104.

The computing system 108 may be hardware or a combination of hardware and software that performs various computation operations associated with the operation of the HMD 100. The operations performed by the computing system 108 include generating or modifying bone conduction signal for sending to the bone conduction transducer assemblies. The computing system 108 communicates with the bone conduction transducer assemblies 118 and the vibration sensor assemblies 120 over a wired network, for example via a wire 122, or a wireless network (e.g., BLUETOOTH®). A bone conduction transducer assembly 118 may include a bone conduction transducer array, among other components, to transmit vibrations to a target region. As illustrated in FIG. 1A, the computing system 108 is positioned on the right side arm 106A. However, in alternate configurations, the computing system 108 may be on another part of the frame 102 (e.g., on the left side arm 106B), may be inside the frame 102 (e.g., inside the side arms 106), or may be located separate and remote from the HMD 100. The component and functions of the computing system 108 are further described below in detail with reference to FIG. 2.

The camera 110 is configured to capture image and/or videos. The camera 110 has a small form factor. As illustrated in FIG. 1A, the camera 110 is positioned in a front portion of the frame 102 near the right lens element 104A and the right side arm 106A. However, in alternate configurations, the camera 110 may be positioned in another part of the frame 102 (e.g., in a front portion of the frame 102 near the left lens element 104B and the left side arm 106B, in the right side arm 106A, in the left side arm 106B, in a middle portion of the front frame 105, and the like). In one embodiment, the camera 110 may cover a field of view that at least partially overlaps with the user's field of view seen through the lens elements 104.

The sensor 112 detects a position and movement of the HMD 100. The sensor 112 may include one or more of microphones, global positioning systems (GPS) sensors, magnetometers (compasses), gyroscopes, accelerometers, and the like. As illustrated in FIG. 1A, the sensor 112 is positioned in a front portion of the frame 102 near the right lens element 104A and the right side arm 106A. However, in alternate configurations, the sensor 112 may be positioned in another part of the frame 102 (e.g., in a front portion of the frame 102 near the left lens element 104B and the left side arm 106B, in the right side arm 106A, in the left side arm 106B, in a middle portion of the frame 102 between the right side arm 106A and the left side arm 106B, and the like).

The touch pad 114 receives user input associated with the operation of the HMD 100. For instance, the touch pad 114 may sense and resolve position and movement of an object (e.g., a finger of the user of the HMD 100). The touch pad 114 may use resistance sensing, capacitive sensing, surface acoustic wave sensing, pressure sensing, optical sensing, and the like. The touch pad 114 may provide tactile feed to the finger of the user touches the touch pad 114. As illustrated in FIGS. 1A and 1B, the touch pad 114 is positioned in the right side arm 106A. In alternate configurations, the touch pad 114 may be positioned in another part of the frame 102 (e.g., in the left side arm 106B).

The display 116 projects, or otherwise displays, images and/or video to the user of the HMD 100. The display 116 may be a projector, a semi-transparent liquid crystal display (LCD), a light emitting diode (LED) display, an organic LED (OLED) display, and the like. As illustrated in FIG. 1A, the display 116 is inside the right lens element 104A. In alternate configurations, the display 116 may be positioned in another part of the frame 102 (e.g., inside the left lens element 104B). Although a single display 116 is illustrated, the HMD 100 may include additional displays 116. For example, the HMD 100 may include one or more displays 116 inside the right lens element 104A and one or more displays 116 inside the left lens element 104B.

Figure 1C:
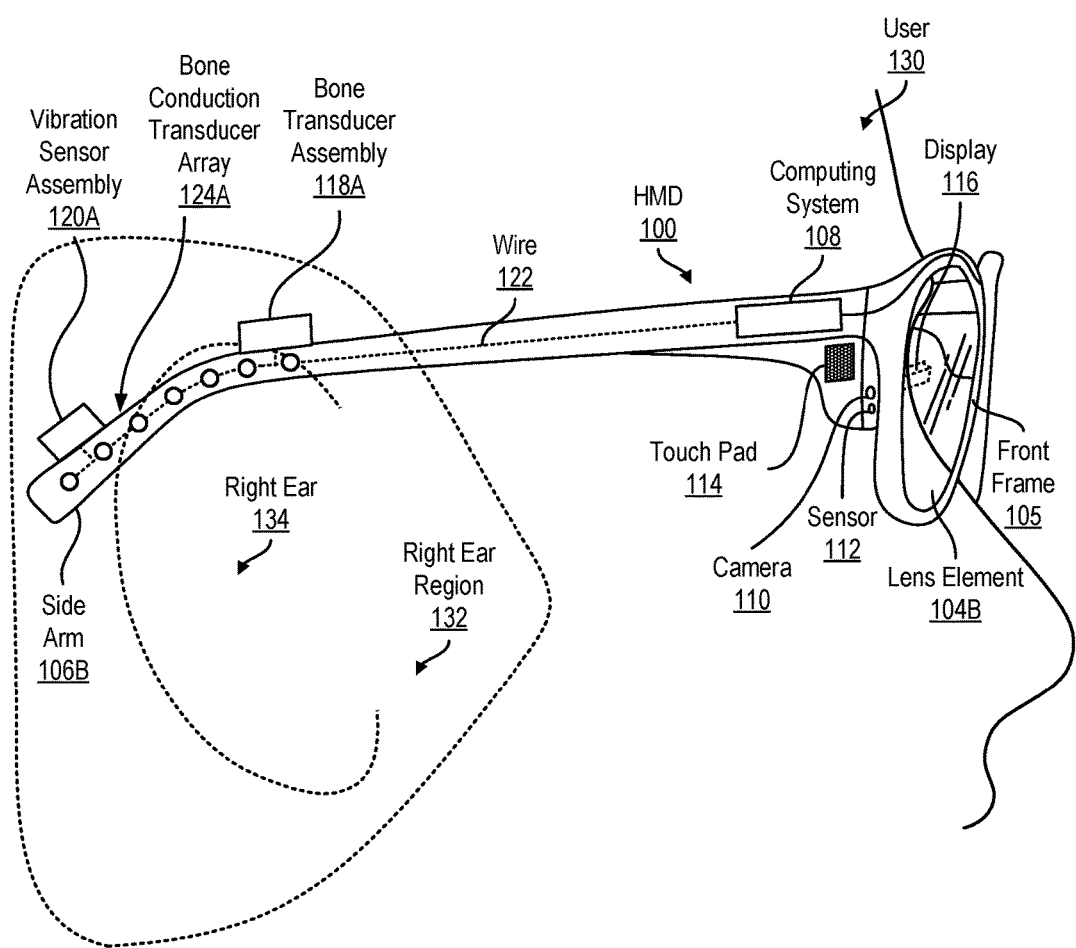

FIG. 1C is a side view of the head mounted display 100 of FIG. 1A including a bone conduction transducer array 124A arranged in a single line, according to one embodiment. The bone conduction transducer assembly 118A of the HMD 100 includes the bone conduction transducer array 124A (not previously shown in FIGS. 1A-1B), among other components, which are further described below with reference to FIG. 3A. The HMD 100 is secured to a user 130 by having the side arms 106 resiliently press against a right ear region 132 and a left ear region (not shown) of the user 130. The right ear region 132 includes a right ear 134, a right temporal bone (not shown) surrounding the right ear 134, and a patch of skin covering the right temporal bone. Similarly, the left ear region (not shown) includes a left ear, a left temporal bone surrounding the left ear, and a patch of skin covering the left temporal bone. The temporal bones are situated at a side and base of a skull of the user 130 and house structures of the ears (e.g., middle and inner ear). In one embodiment, the right side arm 106A is positioned behind the right ear 134 of the user 130 and comes into contact with the right ear region 132 of the user 130. Similarly, the left side arm 106B is positioned behind the left ear (not shown) of the user 130 and comes into contact with the left ear region (not shown) of the user 130.

The bone conduction transducer assemblies 118 transmit vibrations to the temporal bones of the user 130. The bone conduction transducer assemblies 118 come into contact with patches of skin of the user 130. Specifically, the bone conduction transducer array 124A of the right bone conduction transducer assembly 118A comes into contact with a patch of skin covering the right temporal bone in the right ear region 132. Similarly, another bone conduction transducer array (not shown) of the left bone conduction transducer assembly 118B comes into contact with a patch of skin covering the left temporal bone in the left ear region. The bone conduction transducer assemblies 118 are further described with respect to FIG. 3A. Although FIG. 1C illustrates the bone conduction transducer array 124A coming into a patch of skin primarily above and behind the right ear 134, the bone conduction transducer array 124A can be placed in other regions of the right ear region 132 such as a bottom of the right ear 134.

Although the bone conduction transducer assemblies 118 are attached to the HMD 100 in FIG. 1A through 1C, in other embodiments, the bone conduction transducer assemblies 118 may be part of a system separate from the HMD 100. For example, a bone conduction transducer assembly 118 is coupled to an ear piece that is worn on the user's ear. The ear piece may attach to the user's ear using a clip, hook, adhesive, or other type of mechanism. Further, the ear piece may be more compact in size than the HMD 100 because the earpiece does not include components such as the frame 102, lens elements 104, or display 116. The ear piece may include the computing system 108 and a vibration sensor assembly 120A for generating and processing bone conduction signals.

In the embodiment shown in FIG. 1A, the bone conduction transducer array 124A is arranged in a single bent line. In particular, the bone conduction transducer array 124A includes seven separate bone conduction transducers positioned along the side arm 106B in the right ear region 132. In other embodiments, the bone conduction transducer array 124A may include any number of separate bone conduction transducers. By including arrays of multiple bone conduction transducers, the bone conduction transducer assemblies 118 can amplify the amount of vibrations transmitted to a targeted cochlea region of a user's ear (hereinafter also referred to as "a target region"). For this purpose, the arrangement of the separate bone conduction transducers can be arranged in a certain configuration. For instance, the bone conduction transducer array 124A may be arranged in a single line that is bent (as shown in FIG. 1A) or not bent. The bone conduction transducer array 124A may also be arranged in other patterns, which are further described below with reference to FIGS. 1D and 1E.

The vibration sensor assemblies 120 come into contact with patches of skin of the user to detect the vibrations resulting from one or both bone conduction transducer assemblies 118. Specifically, the right vibration sensor assembly 120A comes into contact with a patch of skin covering the temporal bone in right ear region. Similarly, the left vibration sensor assembly 120B comes into contact with a patch of skin covering the temporal bone in left ear region. The vibration sensor assemblies 120 are further described with respect to FIG. 3B.

A vibration sensor assembly (e.g., 120A) at one side is used in conjunction with a bone conduction transducer assembly at the same side (e.g., 118A) to perform calibration. For example, during a calibration process, vibrations generated by the bone conduction transducer array 124A are detected by the vibration sensor assembly 120A to detect the characteristics of crosstalk vibrations. By determining the correlation of the generated vibrations and the detected vibrations, the HMD 100 may vary the magnitude or phase of the bone conduction signals to increase levels of vibration at a target region on the side of the user's ear, as is further described below with reference to FIG. 2.

Figure 1D:
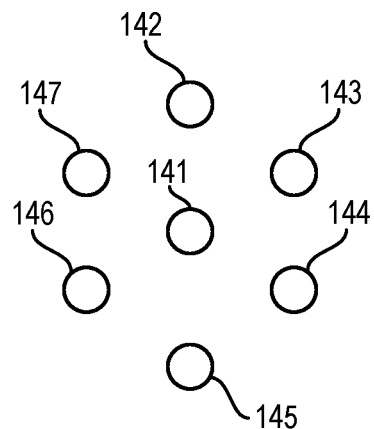

FIG. 1D is a diagram of a bone conduction transducer array 140 arranged in a circular pattern around a center bone conduction transducer 141, according to one embodiment. In the example shown in FIG. 1D, each of the bone conduction transducers of the array 140 are circular-shaped. Six of the bone conduction transducers 142-147 are arranged in a circular pattern (e.g., at vertices of a hexagon) and a "virtual circle" formed by the six bone conduction transducers 142-147 is concentric with the (seventh) center bone conduction transducer 141 of the array 140. In other embodiments, the bone conduction transducers may be arranged in a pattern that is not symmetric across one or more axis of reflection.

Figure 1E:
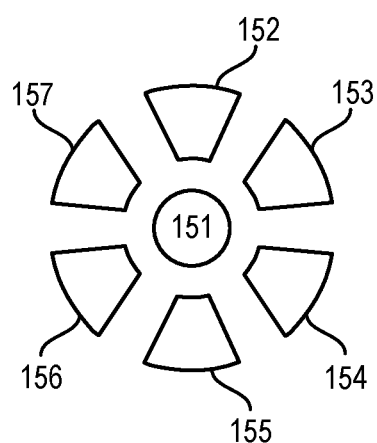

FIG. 1E is a diagram of a bone conduction transducer array 150 including bone conduction transducers that are not circular-shaped, according to one embodiment. In the example shown in FIG. 1E, six of the bone conduction transducers 152-157 of the array 140 are not circular-shaped. Rather, the six bone conduction transducers 152-157 resemble radial slices of a circular ring. The array 150 also includes a seventh bone conduction transducer 151 that is circular-shaped, unlike the other six bone conduction transducers 152-157. Additionally, the six bone conduction transducers 152-157 are arranged in a circular pattern and a "virtual circle" formed by the six bone conduction transducers 152-157 is concentric with the seventh conduction transducer 151 of the array 150.

Example Computing System

Figure 2:
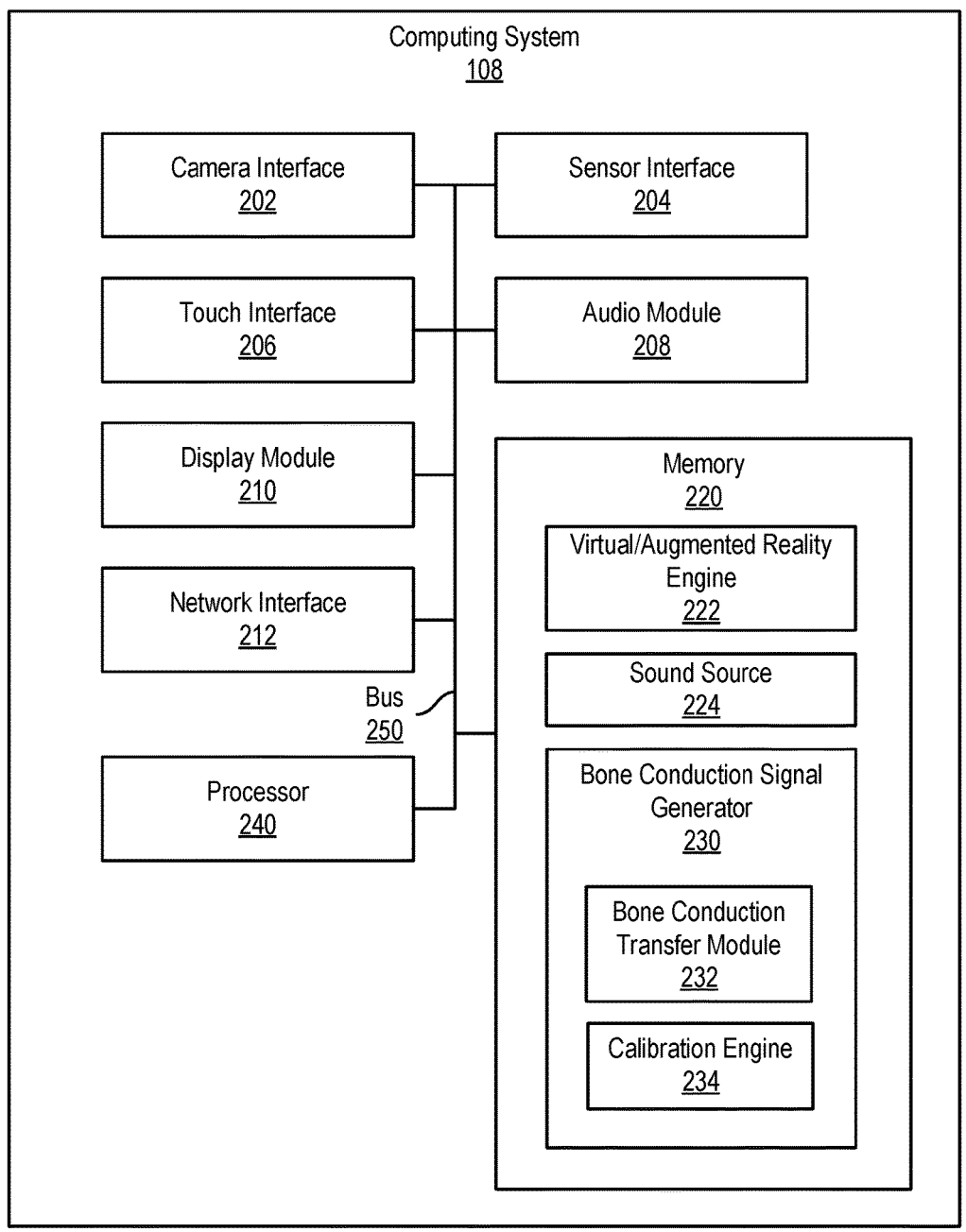
FIG. 2 is a block diagram of a computing system for generating bone conduction signals, according to one embodiment.

FIG. 2 is a block diagram of the computing system 108 for generating at least one generating bone conduction signals, according to one embodiment. The computing system 108 includes, among others, a camera interface 202, a sensor interface 204, a touch interface 206, an audio module 208, a display module 210, a network interface 212, a memory 220, a processor 240, and a bus 250 connecting these components. The processor 240 executes instructions stored in the memory 220.

The camera interface 202 is configured to interface with the camera 110. The camera interface 202 may store images and/or videos captured by the camera 110 in the memory 220. The camera interface 202 may process (e.g., transcode) the images and/or videos captured by the camera 110.

The sensor interface 204 is configured to interface with the sensor 112. The sensor interface 204 may store sensor data corresponding to the position and movement of the HMD 100 detected by the sensor 112 in the memory 220.

The touch interface 206 is configured to interface with the touch pad 114. The touch interface 206 may store sensor data corresponding to user input received by the touch pad 114 and associated with the operation of the HMD 100 in the memory 220.

The audio module 208 is configured to interface with an audio source (e.g., sound source 224) and an audio sink (e.g., bone conduction transducer assemblies 118). The audio module 208 may receive a sound signal from the audio source, process the received sound signal, and transmit the processed sound signal to the audio sink.

The display module 210 is configured to interface with a video source (e.g., virtual/augmented reality engine 222) and a display (e.g., the display 116). The display module 210 may receive a video signal from the video source and may transmit the video signal to the display.

The network interface 212 is configured to communicatively connect the computing system 108 to external systems, such as an audio source, a video source, a reality engine, and the like. The network interface 212 may communicate over the Internet, over a LAN, a WAN, a mobile wired or wireless network, a private network, a virtual private network, or a combination thereof.

The memory 220 is a non-transitory computer-readable storage medium storing, among others, a virtual/augmented reality engine 222, a sound source 224, and a bone conduction signal generator 230. The memory 220 also includes software components not illustrated in FIG. 2 such as an operation system (OS).

The virtual/augmented reality engine 222 generates video data for sending to the display module 210, audio data for sending to the audio module 208 and peripheral data for sending to other user interface devices to provide the sense of virtual or augmented reality to the user. In one embodiment, the virtual/augmented reality engine 222 receives information from the camera via the camera interface 202, the sensors via the sensor interface 204, and the touch pad via the touch interface 208. Based on the received information, the virtual/augmented reality engine 222 determines audio data, video data and peripheral data to be provided to the user of the HMD 100. In a virtual reality scenario, for example, if the HMD 100 detects turning of the user's head to the right or left, the virtual/augmented reality engine 222 generates and sends images corresponding to the right side view or left side view to the display module 210 and correspondingly changed audio data to the audio module 208. In an augmented reality scenario, for example, if the HMD 100 detects that the user looked to the left or right, the virtual/augmented reality engine 222 provides audio and video data to the audio module 208 and the display module 210 that mirrors the user's movement in an augmented environment.

The sound source 224 provides, to the virtual/augmented reality engine 222, a sound signal. The sound source 224 may, for example, be an application program (e.g., gaming program), sound signals detected from the user's environment, audio data received from a remote source via a network interface 212.

The bone conduction signal generator 230 generates bone conduction signals corresponding to a sound signal from the virtual/augmented reality engine 222. The bone conduction signals include vibration signals representing vibrations to be transmitted by the bone conduction transducer assemblies 118. The bone conduction signal generator 230 may include, among other components, a bone conduction transfer module 232 and a calibration engine 234.

The bone conduction transfer module 232 is a software module for generating bone conduction signals that result in stereo or spatial audio when applied to left and right bone conduction transducer assemblies 118. In one embodiment, the bone conductive transfer module 232 uses head-related transfer functions (HRTFs) to process the sound signal and generate a right bone conduction signal for the right bone conduction transducer assembly 118A and a left bone conduction signal for the left bone conduction transducer assembly 118B. The bone conduction signals may be digital signals. As a result of processing by the bone conductive transfer module 232, the user of the HMD 100 may perceive the sound (resulting from the vibrations generated by the bone conduction transducer assemblies 118) as originating from a certain spatial location. For this purpose, the virtual/augmented reality engine 222 may provide spatial location information indicating a 2D or 3D location from which the user should perceive the sound as being originated.

The bone conduction transfer module 232 can generate bone conduction signals having different amplitudes or phases for any number of bone conduction transducers in a bone conduction transducer array (for example, as shown in FIGS. 1C-E). The amplitudes or phases of the bone conduction signals may be set to spatially localize the vibrations and increase a level of vibrations in a target region. Example algorithms (e.g., beamforming techniques) known to one skilled in the art for determining or optimizing the amplitude or phase of signals are further described in "Radar Technology" by Eli Brookner and published by Lex Books, Lexington, Mass. in 1996; "Optimum Array Processing" by Harry L. Van Trees and published by Wiley-Interscience, New York in 2002; "Nearfield broadband array design using a radially invariant modal expansion" by Thushara D. Abhayapala, Rodney A. Kennedy, and Robert C. Williamson and published by the Journal of the Acoustical Society of America in January 2000; and "Robust beamforming under uncertainties in the loudspeakers directivity pattern" by L. Bianchi, R. Magalotti, F. Antonacci, A. Sarti, S. Tubaro and published in the IEEE International Conference on Acoustics, Speech and Signal Processing (ICASSP) in 2014, which are each hereby incorporated by reference in their entirety for all purposes.

The calibration engine 234 performs a calibration process to update bone conduction signals generated by the bone conduction transfer module 232. The ears of different users may vary in size or shape. Further, a first cochlea of a first user may be located at a distance underneath a patch of skin in an ear region of the first user, while a second cochlea of a second user may be located at a different distance underneath another patch of skin in an ear region of the second user. To account for these physical anatomical differences between users, the calibration engine 234 generates calibration values that may be used to modify bone conduction signals.

As an example use case, a bone conduction transducer assembly 118 transmits vibrations responsive to a bone conduction signal. The vibration sensor assembly 120 on the same side of the user's head detects the vibrations generated by the bone conduction transducer assembly 118. The calibration engine 234 receives the detected vibrations from the vibration sensor assembly 120 and generates calibration values using the detected vibrations. The calibration engine 234 provides the calibration values to the bone conduction transducer assembly 118. The bone conduction transducer assembly 118 generates a modified version of the bone conduction signal by taking into account the calibration values. The calibration engine 234 may calibrate one or more separate bone conduction transducers of an array by generating different calibration values for each calibrated bone conduction transducer. By calibrating the bone conduction transducers, the bone conduction transducer assembly 118 may transmit a more focused beam of vibrations toward a target ear region, which results in improved audio quality or amplified volume perceived by the user.

In one embodiment, the calibration engine 234 performs a calibration process with a sample population of users each wearing a HMD 100. In particular, the calibration engine 234 provides instructions (e.g., presented via the display 116) to the users to cancel (e.g., match) an airborne sound by adjusting the phase of vibrations transmitted by bone conduction transducers of the HMD 100. For example, the users may adjust the phase by providing user input using the touch pad 114. Additionally, the calibration engine 234 may also provide instructions for the users to match the amplitude of the airborne sound by adjusting the amplitude of the vibrations transmitted by bone conduction transducers. The calibration engine 234 may aggregate the responses from the users to generate calibration values, e.g., determining the average adjusted phase and amplitude values of the sample population.

In some embodiments, the calibration engine 234 receives sensor data from an accelerometer sensor 112 of the HMD 100. The accelerometer sensor 112 generates the sensor data by detecting vibration levels (e.g., amplitudes) and phases while the users are completing the calibration process described above. The calibration engine 234 can map the vibration levels and phases to hearing sensation levels of the users, to help correct for individual variations in the physical fit of the HMD 100 and input impedance on different users wearing the HMD 100.

In some embodiments, by calibrating the bone conduction transducers, the calibration engine 234 may also attenuate crosstalk between bone conduction transducer assemblies 118 on opposite sides of the user's head. The vibrations transmitted by the right bone conduction transducer assembly 118A are intended to be heard ideally only by the user's right ear. Additionally, the vibrations transmitted by the left bone conduction transducer assembly 118B are intended to be heard ideally only by the user's left ear. By transmitting a focused beam of vibrations responsive to bone conduction signals modified using calibration values, vibrations are localized at the corresponding target region while vibrations at a cochlea of the opposite side of the user's head become negligible. In other words, a calibrated bone conduction transducer may transmit vibrations that increase a level of vibrations at a target region on one side of the user's head but dissipate at the opposite ear region on the other side of the user's head.

Example Bone Conduction Transducer Assembly

Figure 3A:
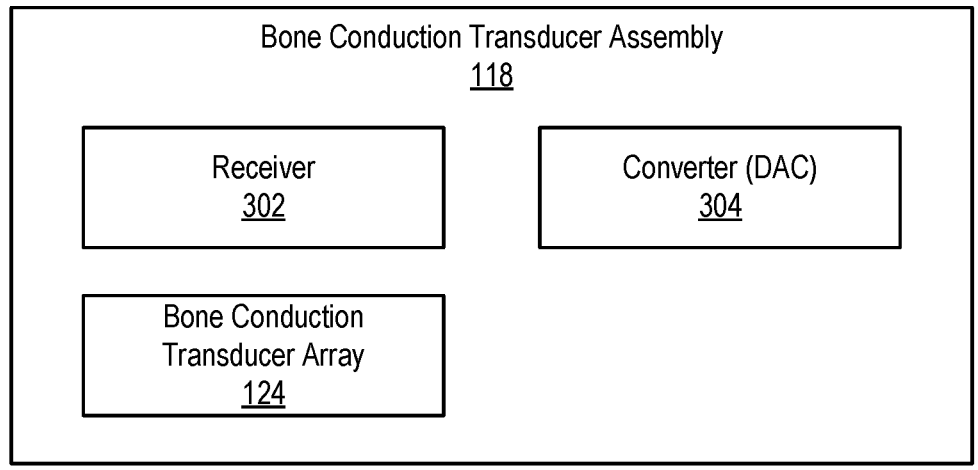
FIG. 3A is a block diagram of a bone conduction transducer assembly, according to one embodiment.

FIG. 3A illustrates a bone conduction transducer assembly 118, according to one embodiment. The bone conduction transducer assembly 118 may include, among other components, a receiver 302, a converter 304, and a bone conduction transducer array 124.

The receiver 302 is a hardware or hardware in combination with software that receives, from the computing system 108, a bone conduction signal representing vibrations to be reproduced by the bone conduction transducer array 124 using a communication protocol. The communication protocol may be a standard protocol or communication protocol specifically developed for communicating the bone conduction signal. The bone conduction signal may be a digital signal.

The converter 304 is a hardware or a hardware in combination with software that generates an analog voltage signal corresponding to the bone conduction signal. The converter 304 may be a digital-to-analog converter (DAC). The converter 304 receives the bone conduction signal in a digital format and converts the signal into an analog signal.

The bone conduction transducer array 124 receives the analog voltage signal from the DAC 304 and generates vibrations transmitted to the ears of the user of the HMD 100 via the cranial bones of the user. For this purpose, the bone conduction transducer array 124 comes into contact with a patch of skin of the user of the HMD 100. The bone conduction transducer array 124 includes two or more separate bone conduction transducers.

Example Vibration Sensor Assembly

Figure 3B:
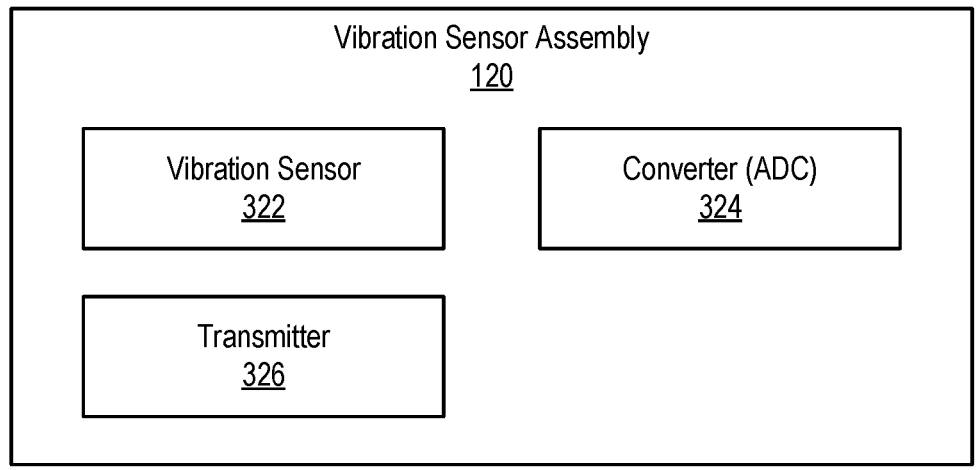
FIG. 3B is a block diagram of a vibration sensor assembly, according to one embodiment.

FIG. 3B illustrates a vibration sensor assembly 120, according to one embodiment. The vibration assembly 120 includes a vibration sensor 322, a converter 324, and a transmitter 326. The vibration sensor assembly 120 detects vibration and sends data on the detected vibration to the computing system 108 for producing a parameter used for generating the vibration signal.

The vibration sensor 322 detects vibrations and generates an analog signal representing the vibrations. The vibration sensor 322 may detect the vibrations responsive to transmitting of vibrations by a bone conduction transducer. For this purpose, the vibration sensor 322 comes into contact with a patch of skin of the user of the HMD 100.

The converter 324 generates a sensor signal representing the vibrations detected by the vibration sensor 322. The converter 324 may be an analog-to-digital converter to convert analog version of the sensor signal into a digital sensor signal for transmitting to the computing system 108.

The transmitter 326 transmits, to the computing system 108, the sensor signal generated by the converter 324. The transmitter 326 may embody standard or customized communication protocol to communicate the digital sensor signal to the computing system 108.

Example Bone Conduction Signal Generation

Figure 4:
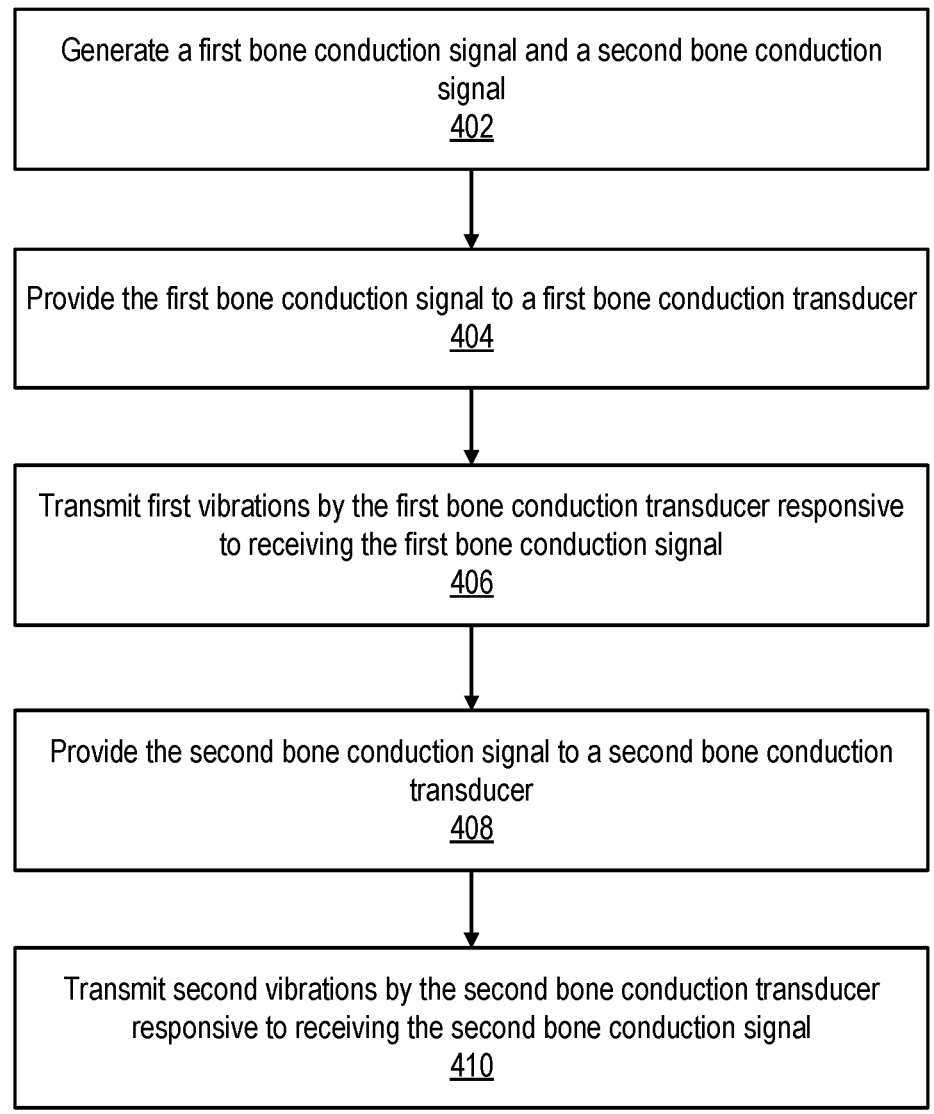
FIG. 4 is a flow chart for providing bone conduction signals to transmit vibrations to a target region, according to one embodiment.

FIG. 4 is a flow chart for providing bone conduction signals to transmit vibrations to a target region, according to one embodiment. The bone conduction signal generator 230 generates 402 a first bone conduction signal and a second bone conduction signal. The bone conduction signal generator 230 provides 404 the first bone conduction signal to a first bone conduction transducer of a bone conduction transducer array. The first bone conduction transducer contacts a patch of skin in a first ear region of the user. The first bone conduction transducer 406 transmits first vibrations responsive to receiving the first bone conduction signal. The first vibrations cause a level of vibrations at a target region in the first ear region.

The bone conduction signal generator 230 provides 408 the second bone conduction signal to a second bone conduction transducer of the bone conduction transducer array. The second bone conduction transducer contacts the patch of skin in the first ear region. The second bone conduction transducer transmits 410 second vibrations responsive to receiving the second bone conduction signal. The second vibrations increase the level of vibrations at the target region.

The same process of generating 402 bone conduction signals, providing 404 the bone conduction signals to bone conduction transducers, and transmitting 406 vibrations by the bone conduction transducers to the target region can be repeated for a number of times, each time for additional bone conduction transducers of a bone conduction transducer array, or for bone conduction transducers on the opposite side of the user's head.

In some embodiments, the bone conduction signal generator 230 may perform steps 404 or 406 simultaneously with steps 408 or 410. In other words, the first bone conduction transducer and the second bone conduction transducer may transmit the first and second vibrations, respectively, at the same (or close to the same) time. Further, the bone conduction signal generator 230 may provide additional bone conduction signals to additional bone conduction transducers simultaneously with providing the first and second bone conduction signals. Any number of bone conduction transducers of a bone conduction transducer array may also simultaneously transmit vibrations to one or more target regions.

What is claimed is:

1. A head-mounted display (HMD) comprising:
   a bone conduction signal generator configured to generate a first bone conduction signal and a second bone conduction signal;
   a first bone conduction transducer coupled to the bone conduction signal generator, the first bone conduction transducer configured to contact a patch of skin in a first ear region of a user, and configured to transmit first vibrations responsive to receiving the first bone conduction signal, the first vibrations causing a level of vibrations at a target region in the first ear region; and a second bone conduction transducer coupled to the bone conduction signal generator, the second bone conduction transducer configured to contact the patch of skin in the first ear region, and configured to transmit second vibrations responsive to receiving the second bone conduction signal, the second vibrations increasing the level of vibrations at the target region.

2. The HMD of claim 1, wherein the first bone conduction transducer and the second bone conduction transducer are mounted to the HMD in a single line.

3. The HMD of claim 2, wherein the single line is bent.

4. The HMD of claim 1, wherein the first bone conduction transducer and the second bone conduction transducer are part of a plurality of bone conduction transducers mounted to the HMD in a circular pattern.

5. The HMD of claim 4, wherein each of the plurality of bone conduction transducers are circular-shaped.

6. The HMD of claim 4, wherein the plurality of bone conduction transducers are not circular-shaped and wherein the circular pattern is concentric to a circular-shaped bone conduction transducer.

7. The HMD of claim 1, wherein the first bone conduction signal has at least one of a first amplitude or a first phase different than a second amplitude or a second phase, respectively, of the second bone conduction signal.

8. The HMD of claim 1, further comprising:
a vibration sensor configured to detect the first vibrations; and
a calibration engine coupled to the vibration sensor to receive the detected first vibrations and coupled to the bone conduction signal generator, the calibration engine configured to:
generate calibration values using the detected first vibrations; and
provide the calibration values to the bone conduction signal generator, wherein the bone conduction signal generator generates a modified version of the first bone conduction signal by taking into account the calibration values.

9. The HMD of claim 1, wherein the second vibrations do not increase another level of vibrations at a second ear region of the user.

10. The HMD of claim 1, further comprising:
a third bone conduction transducer coupled to the bone conduction signal generator, the third bone conduction transducer configured to contact another patch of skin in a second ear region of the user; and
a fourth bone conduction transducer coupled to the bone conduction signal generator, the fourth bone conduction transducer configured to contact the other patch of skin in the second ear region, wherein vibrations transmitted by the third and fourth bone conduction transducers are attenuated at the first ear region.

11. A method of operating a head-mounted display (HMD), comprising:
generating a first bone conduction signal and a second bone conduction signal by a first bone conduction transducer;
providing the first bone conduction signal to a first bone conduction transducer;
transmitting first vibrations by the first bone conduction transducer responsive to receiving the first bone conduction signal, the first bone conduction transducer contacting a patch of skin in a first ear region of a user, the first vibrations causing a level of vibrations at a target region in the first ear region;
providing the second bone conduction signal to a second bone conduction transducer; and
transmitting second vibrations by the second bone conduction transducer responsive to receiving the second bone conduction signal, the second bone conduction transducer contacting the patch of skin in the first ear region, the second vibrations increasing the level of vibrations at the target region.

12. The method of claim 11, wherein the first bone conduction transducer and the second bone conduction transducer are mounted to the HMD in a single line.

13. The method of claim 12, wherein the single line is bent.

14. The method of claim 11, wherein the first bone conduction transducer and the second bone conduction transducer are part of a plurality of bone conduction transducers mounted to the HMD in a circular pattern.

15. The method of claim 14, wherein each of the plurality of bone conduction transducers are circular-shaped.

16. The method of claim 14, wherein the plurality of bone conduction transducers are not circular-shaped and wherein the circular pattern is concentric to a circular-shaped bone conduction transducer.

17. The method of claim 11, wherein the first bone conduction signal has at least one of a first amplitude or a first phase different than a second amplitude or a second phase, respectively, of the second bone conduction signal.

18. The method of claim 11, further comprising:
detecting the first vibrations by a vibration sensor; and
receiving the detected first vibrations by a calibration engine;
generating, by the calibration engine, calibration values using the detected first vibrations; and
generating a modified version of the first bone conduction signal by taking into account the calibration values.

19. A system comprising:
a first bone conduction transducer contacting a patch of skin in a first ear region of a user;
a second bone conduction transducer contacting the patch of skin in the first ear region; and
a processor configured to:
generate a first bone conduction signal and a second bone conduction signal;
provide the first bone conduction signal to a first bone conduction transducer, the first bone conduction transducer transmitting first vibrations responsive to receiving the first bone conduction signal, the first vibrations causing a level of vibrations at a target region in the first ear region; and
provide the second bone conduction signal to a second bone conduction transducer, the second bone conduction transmitting second vibrations responsive to receiving the second bone conduction signal, the second vibrations increasing the level of vibrations at the target region.

20. The system of claim 19, wherein the processor is further configured to:
receive the first vibrations detected by a vibration sensor;
generate calibration values using the detected first vibrations; and
generate a modified version of the first bone conduction signal by taking into account the calibration values.

* * * * *